(No Model.)
S. STURGIS.
DUMPING CART.
No. 328,981. Patented Oct. 27, 1885.
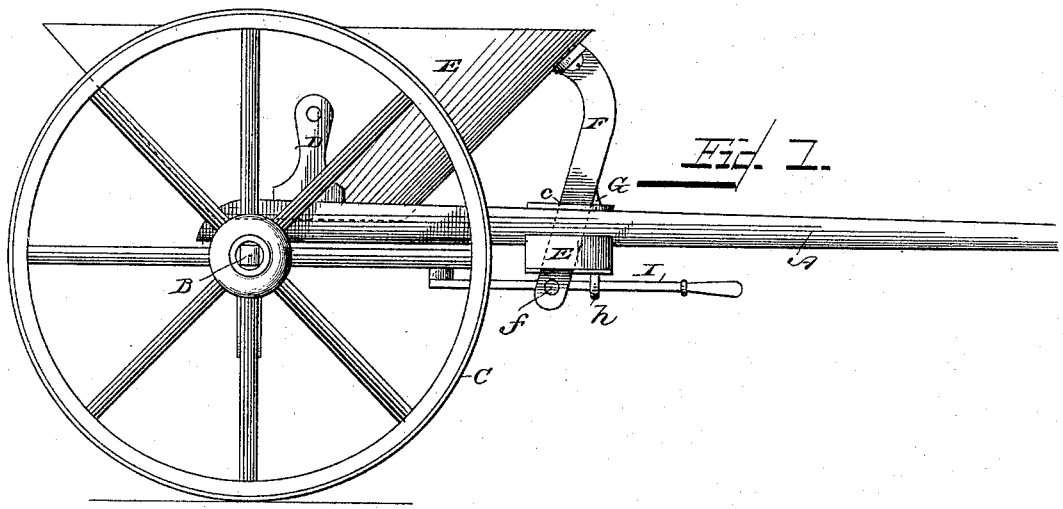
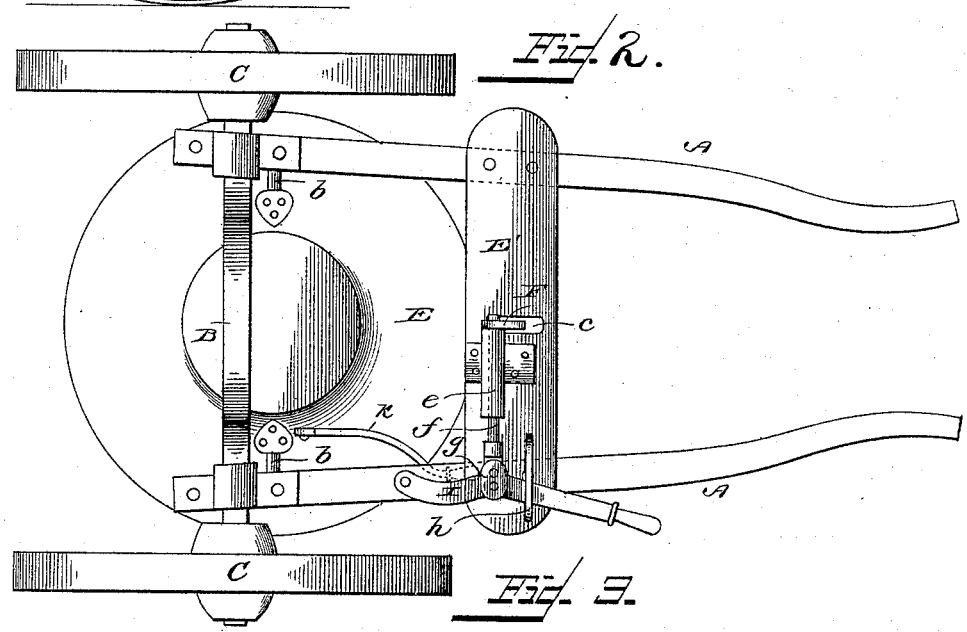
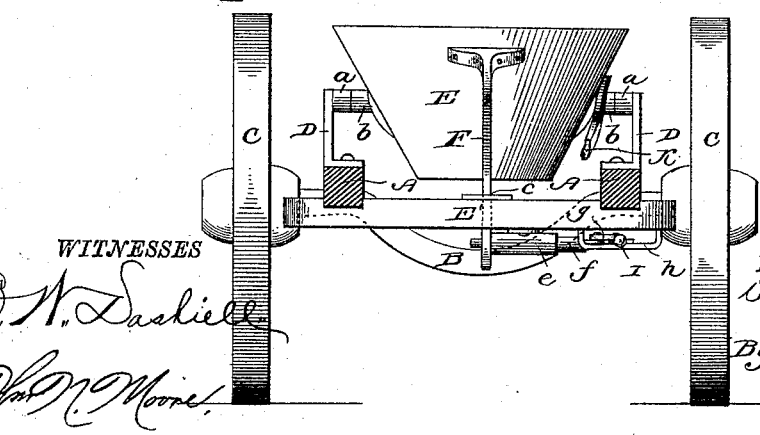
WITNESSES
INVENTOR
Samuel Sturgis
By C. A. Snow
Attorneys

UNITED STATES PATENT OFFICE.

SAMUEL STURGIS, OF MANAYUNK, PENNSYLVANIA.

DUMPING-CART.

SPECIFICATION forming part of Letters Patent No. 328,981, dated October 27, 1885.

Application filed July 17, 1885. Serial No. 171,883. (No model.)

*To all whom it may concern:*

Be it known that I, SAMUEL STURGIS, a citizen of the United States, residing at Manayunk, in the county of Philadelphia and State of Pennsylvania, have invented a new and useful Improvement in Dumping-Carts, of which the following is a specification, reference being had to the accompanying drawings.

My invention relates to dumping-carts adapted particularly for use in paper-mills for transporting pulp, &c., the object being to provide an improved construction of catch or locking device which when released will allow the body of the cart to automatically dump its load and then return to its normal or upright position.

With these ends in view the invention consists in the improved construction and combinations of parts hereinafter fully described, and pointed out in the claims.

In the drawings, Figure 1 is a side elevation of a dumping-cart embodying my invention. Fig. 2 is a bottom view; and Fig. 3 is a transverse section showing the axle in full lines.

In the accompanying drawings, in which like letters of reference indicate corresponding parts in all the figures, A represents the shafts, which are secured at their ends to the axle B. This axle B is bent or curved, and upon the ends thereof are mounted carrying-wheels C.

Upon the upper sides of the shafts, just in front of the axle, are provided upwardly-extending brackets D, having bearing-boxes *a* at their upper ends.

E represents the body of the cart, which in this instance is shown as constructed of a very heavy quality of sheet metal. The said body is circular in form, and larger at its upper than at its lower end, so that matter in said body will readily slide therefrom when the body is dumped. Projecting outwardly from the sides of the cart, from points just in rear of a line drawn centrally across the body, are gudgeons or trunnions *b*, which bear in the boxes *a* of the brackets D. It will thus be seen that the body of the cart is eccentrically pivoted. The shafts of the cart are connected at a point just in front of the forward end of the body by a bar, E', which is provided with a slot or opening, *c*.

F represents a curved arm, which projects from the front side of the body, near the upper end thereof. The lower end of said arm is formed with a hole or opening, and said end is adapted to project through the slot *c* in the bar E'. The curved arm F is formed with a lug or projection, G, which is adapted to limit the downward movement of the front end of the cart and support it by bearing upon the upper side of the bar E'.

Upon the under side of the bar E' is provided a sleeve or casing, *e*, in which slides a locking-bolt, *f*, the inner end of which projects beyond said casing and is adapted to engage the hole or opening in the lower end of the curved arm, and thus hold the body from dumping.

I represents a lever, which is pivoted to the under side of one of the shafts, and which is pivotally connected with the locking-bolt *f* by plates *g*, which are secured to said lever about midway its ends, said lever working in a guide, *h*, whereby its movement is limited.

Projecting forwardly from one side of the body of the cart is an arm or handle, K, whereby the body may be easily dumped should it become hung or stuck.

In operation, when the cart is loaded and the locking-bolt removed from engagement with the opening in the curved arm, the body automatically dumps, and when the load is removed the cart returns to its normal position, the lug on the curved arm serving as a stop. The locking-bolt is then slid into engagement with the opening of the curved arm and the body locked.

Having thus described my invention, I claim—

1. In a dumping-cart, the combination of a bent axle, its bearing-wheels, shafts carrying bearings, an eccentrically-moving body mounted in said bearings, a slotted cross-bar arranged in front of the body and secured to the shafts, a curved arm, F, rigidly secured to the cart-body and passing through the slot in the cross-bar, a sleeve, *e*, rigidly secured to the slotted cross-bar, a bolt, *f*, sliding through said sleeve and adapted to enter an aperture in the arm F to lock it and the cart-body in position, a lever, I, pivoted at its front end to one of the cart-shafts, a link, *g*, pivotally connected to the sliding bolt *f* and the lever I in rear of its fulcrum, and a guard, $h$, arranged over the pivoted lever I and adapted to limit the movement of said lever and the sliding bolt $f$, as set forth.

2. The combination, with the bent or curved axle, the carrying-wheels, and the shafts having brackets secured to the upper sides, of the body having gudgeons or trunnions bearing in boxes of said brackets, a bar having a slot and connecting the shafts, and a curved arm on the body having a lug or projection, as set forth.

In testimony that I claim the foregoing as my own I have hereto affixed my signature in presence of two witnesses.

SAMUEL STURGIS.

Witnesses:
HUGH DOUGHERTY,
WILLIAM JACKSON.